United States Patent [19]

Thornton, Jr.

[11] Patent Number: 4,826,286

[45] Date of Patent: May 2, 1989

[54] FILTER WITH THREE-BAND TRANSMISSION FOR GOOD SEEING

[76] Inventor: William A. Thornton, Jr., 27 Harvard Rd., Cranford, N.J. 07016

[21] Appl. No.: 191,971

[22] Filed: May 6, 1988

[51] Int. Cl.$^4$ ............................ G02B 5/28; G02B 1/10
[52] U.S. Cl. ...................................... 350/166; 350/164
[58] Field of Search ................................ 350/166, 164

[56] References Cited

U.S. PATENT DOCUMENTS

| | | | |
|---|---|---|---|
| 3,877,797 | 4/1975 | Thorton, Jr. .................. | 350/316 X |
| 4,176,299 | 11/1979 | Thorton, Jr. ......................... | 315/326 |
| 4,334,782 | 6/1982 | Thorton, Jr. et al. .............. | 356/406 |

Primary Examiner—Bruce Y. Arnold

[57] ABSTRACT

Filter system operates to provide reasonable seeability for human visual system while simultaneously limiting the total radiation energy impinging upon the eye. System comprises a transparent substrate which carries a plurality of thin layers having indices of refraction which alternately vary from a high index to a low index. Radiations passing the filter system are substantially confined to three bands centered at about 450 nm, 530 nm, and 610 nm with the width of the bands being from about 3 nm to about 50 nm as measured at one-half the maximum measured radiation transmission of each of the bands.

10 Claims, 12 Drawing Sheets

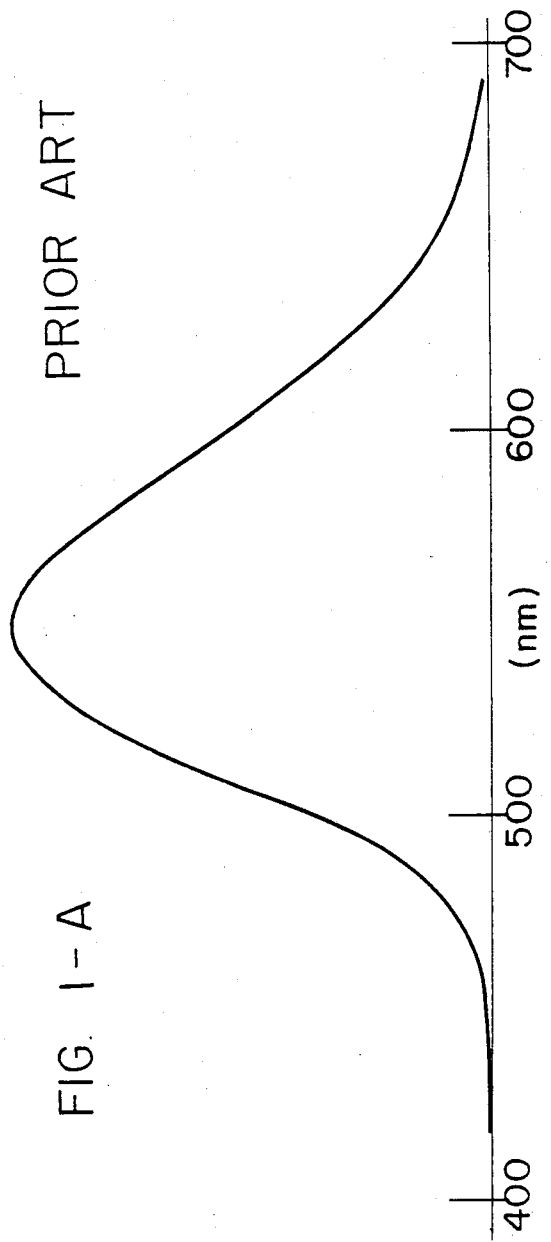

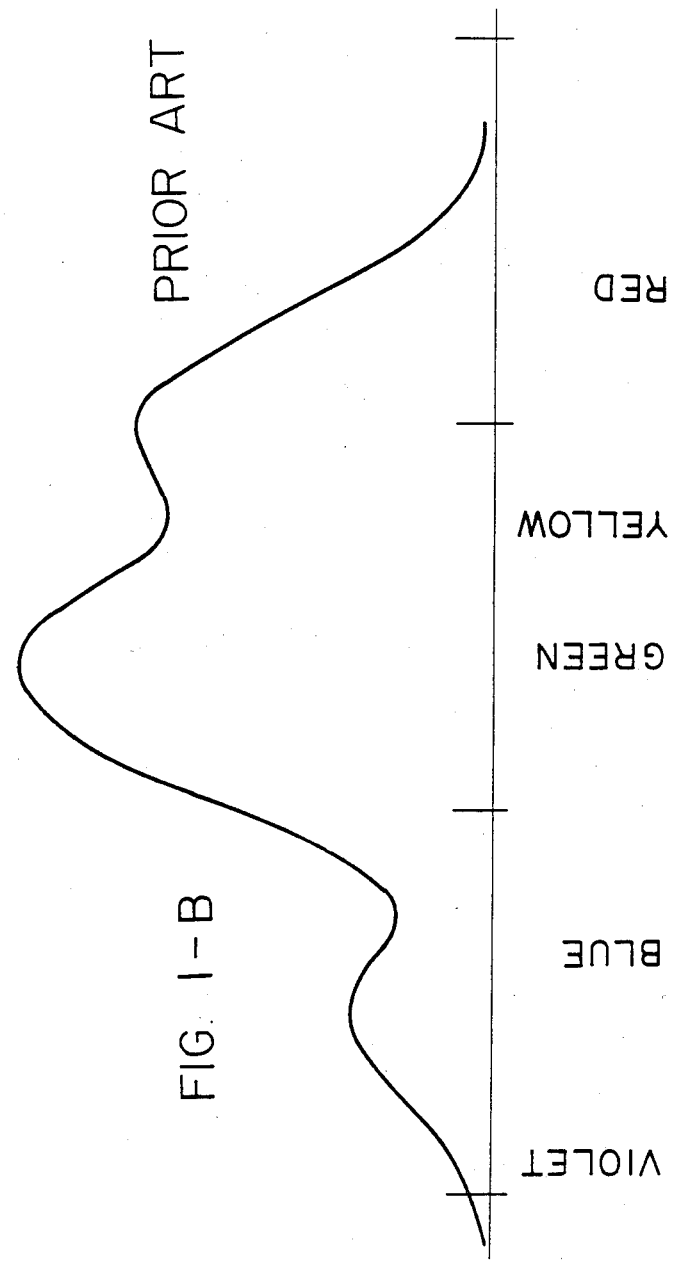

PRIOR ART

PRIOR ART

FILTER WITH THREE-BAND TRANSMISSION FOR GOOD SEEING

BACKGROUND OF THE INVENTION

This invention relates to filter systems and, more particularly, to an improved filter which provides good seeability (i.e., allows good-seeing, by a human observer with normal color vision) while simultaneously limiting the total radiation energy which impinges upon the eye.

Heretofore, little has been known about which wavelength bands reaching the eye are important to good-seeing, and which wavelength bands are either detrimental or of little use. Therefore, "sunglasses" are generally made so as to reduce the intensity of all of the different wavelength bands in the light reaching the eye. It is generally believed, however, that overall reduction of intensity of light reaching the eye always results in poorer seeing.

In U.S. Pat. No. 3,877,797 to W. A. Thornton, the present applicant, is described an optical filter combination which improves color discrimination. In U.S. Pat. No. 4,176,299 to W. A. Thornton is disclosed a method and apparatus wherein good color rendering of illuminated objects is obtained using illumination composed of only three selected wavelengths peaked at about 450 nm, 530 nm and 610 nm. This development has lead to much further work relating to the three-band response of the human visual system.

SUMMARY OF THE INVENTION

There is provided a filter system which operates to give good and reasonable seeability for the human visual system while simultaneously limiting the total radiation energy which impinges upon the eye. The system comprises a transparent substrate having a plurality of thin radiation-transmitting layers carried thereon. The layers alternate from a higher index of refraction to a lower index of refraction and these are selected so that the filter passes radiations substantially confined to three bands having a maximum of transmission at about 450 nm, 530 nm and 610 nm. The width of the bands is from about 10 nm to about 50 nm as measured at one-half the maximum radiation transmission of each of the bands.

BRIEF DESCRIPTION OF THE DRAWINGS

For a better understanding of the invention, reference should be made to the accompanying drawings wherein:

FIG. 1-A is a graph (origin about the year 1900) of what is traditionally taken to be the "visibility curve", or "spectral response of the eye", with respect to wavelength of the incoming light, in nanometers;

FIG. 1-B is a more recent (1933) measurement of the response of the human visual system, showing not the single peak of the earlier, rougher determination, but three peaks of visual response; also with respect to wavelength of the incoming light, in nanometers;

DESCRIPTION OF THE PREFERRED EMBODIMENTS

Prior to discussing the details of the present filter system, it is desirable to review selected reports and studies in the field which support the theoretical background to the present invention. In this regard, all data which are graphed in FIGS. 1–8 are a part of the prior art, but are needed for a full understanding of the present invention.

For good seeing, a human observer does not "need all the light he can get". It should be recognized that the removal of some spectral components, of the light entering the human visual system, can be beneficial; but if (and only if) the removed spectral components are chosen with care.

Maximizing input light (without regard to the spectral composition of the input light) does not generally maximize good-seeing. For example, military personnel, and skiers as well, find benefit from yellow goggles, which subtract short wavelengths from input light. The benefit is due to the facts: (a) ultraviolet content can be uncomfortable, injurious, and can evoke fluorescence within the eye that interferes with clarity of vision; (b) violet and blue-violet input are relatively poorly focussed on the retina; and (c) red-content and green-content of incoming light, both of which are transmitted by 'yellow goggles', are primarily responsible for the seeing of sharp detail.

Thus, the subtraction, or blocking out, of wisely-chosen spectral components of incoming light not only does not detract from good-seeing, but can afford the normal human visual system its best seeing.

The human observer requires three dimensions to describe an incoming ray of light. For example, he may classify incoming lights by brightness, hue, and saturation—'saturation' is intensity of color, as from white to pink to scarlet. Needing three dimensions for description of a light means that his visual system has three independent inputs, each of different spectral response.

This most basic of all facts of human vision is often obfuscated by preoccupation with the "visibility curve", usually pictured and taught as being a single, broad spectral response (FIG. 1-A) characterizing human vision. The "visibililty curve" originated around the turn of the century, when it became urgent to have some means of measuring "amount of light".

Since the three-dimensionality, of classification by humans of incoming lights, demands a three-dimensionality of input to the human visual system, the sensitivity curve of FIG. 1-A could never have been valid; the true sensitivity curve must be somehow threefold. By 1933, at least, there were indications that human spectral sensitivity has, as the argument above makes necessary, three peaks or components (FIG. 1-B).

Figure 2:
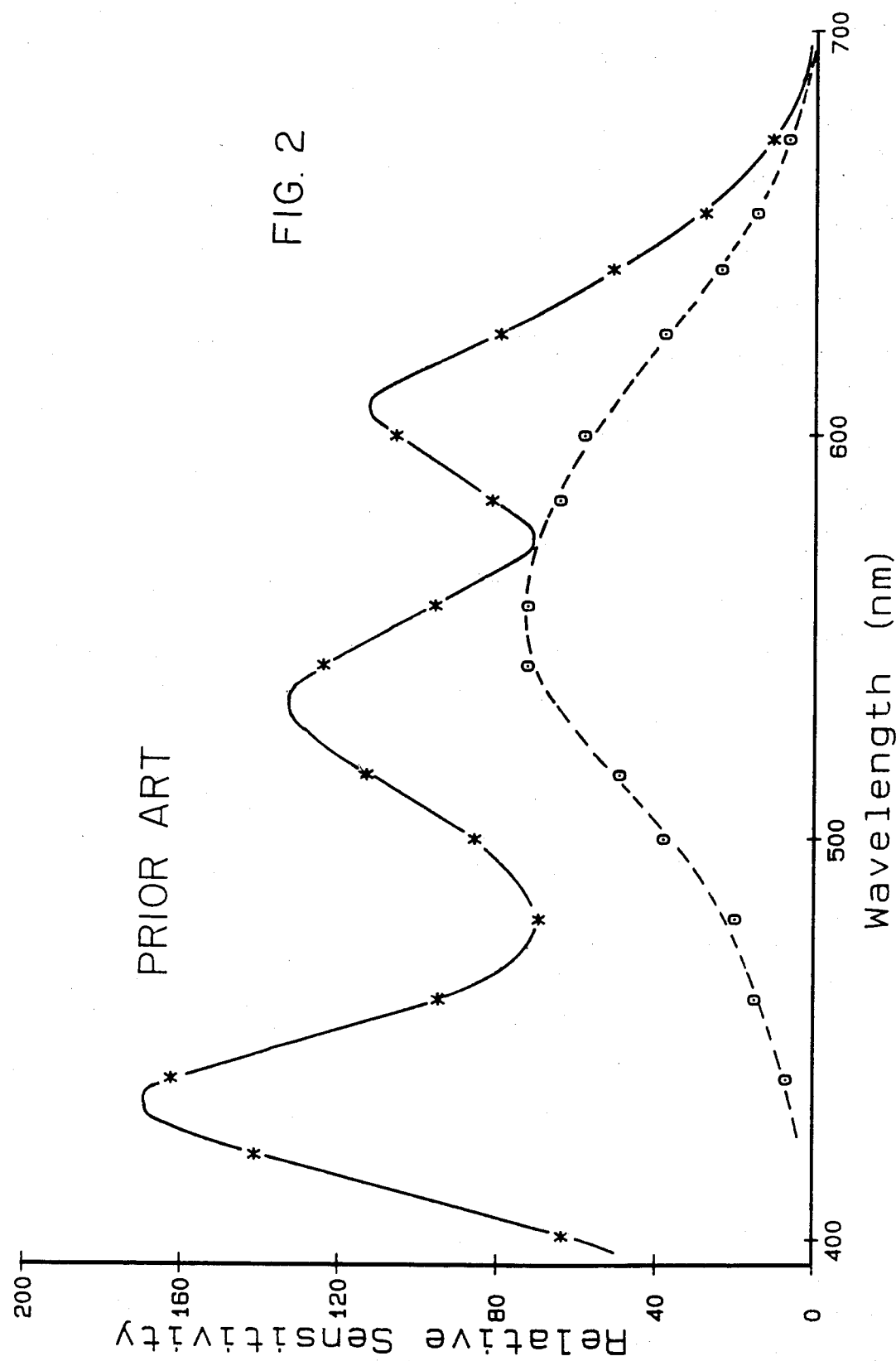
FIG. 2 is a still more recent (1976) determination of human visual response, wherein seeing under typical conditions is represented by the three-peaked curve; and under special conditions — small points of light of short duration — by the lower dashed curve.
Figure 3:
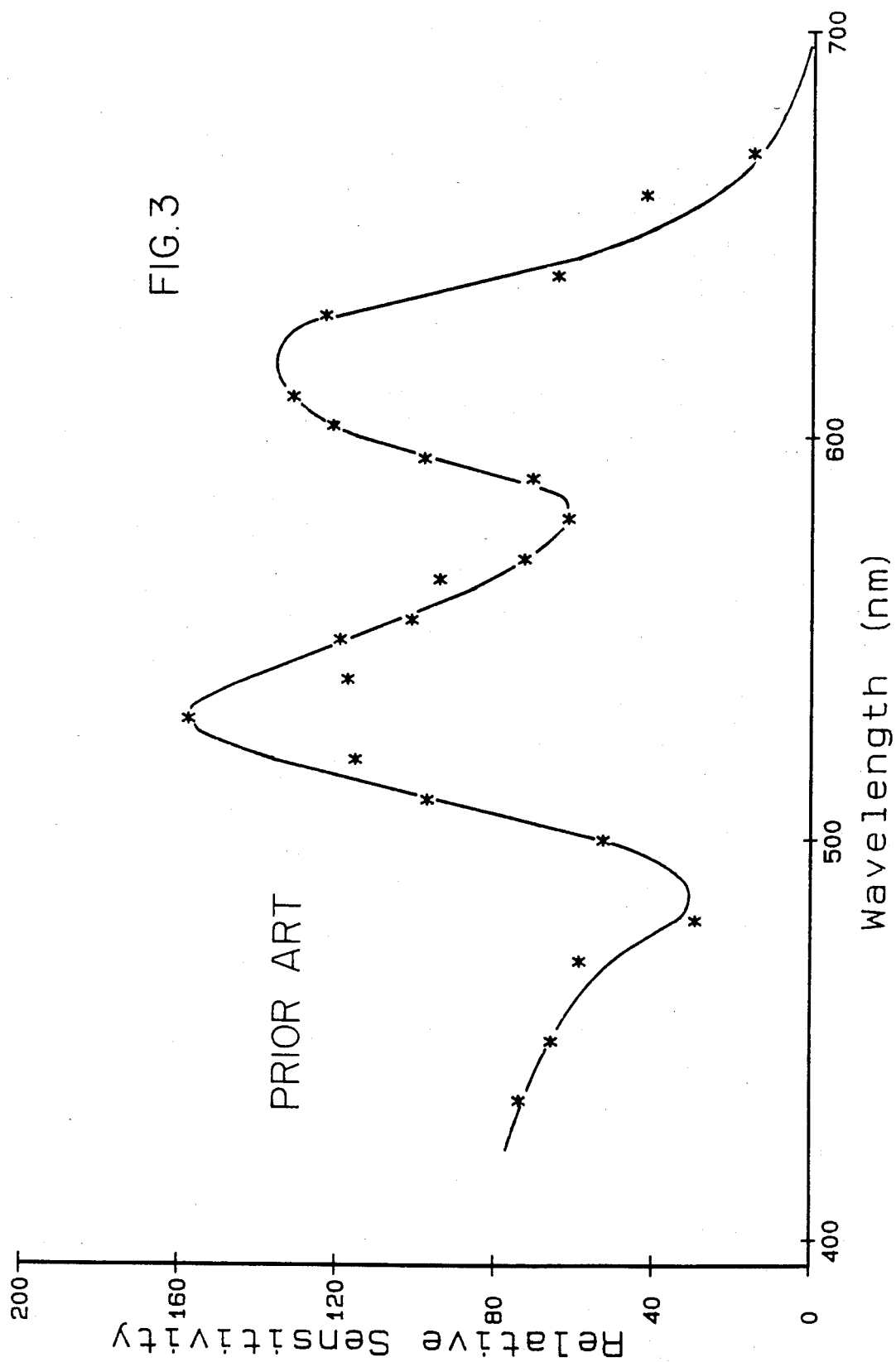
FIG. 3 shows spectral sensitivity peaks at 450,530,610 nm and dips at 480–490 nm and 570–590 nm for both men and monkeys.
Figure 4:
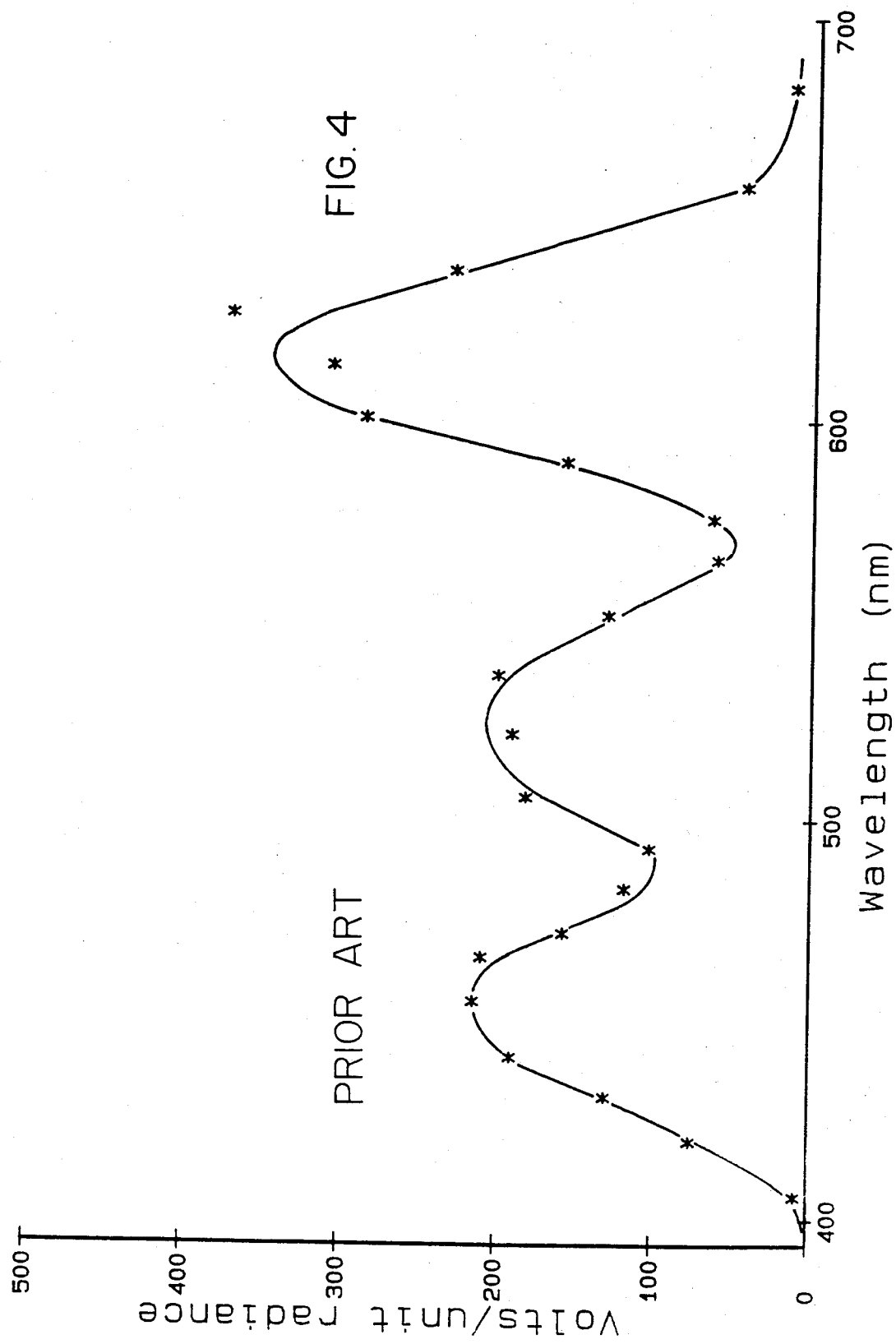
FIG. 4 shows three peaks at 445,525,615 nm via probe potentials from the cortex of primates.

Some further evidence that three peaks, or components, are required to characterize true visual sensitivity appear in the prior art curves of FIGS. 2,3,4. Numerous further references confirm the presence of the three peaks in human sensitivity, and agree with some precision on placement of the peak wavelengths near 450 nm in the blue-violet region of the spectrum, near 530 nm in the green, and near 610 nm in the orange-red.

Is the light transmitted by special goggles, for example, bright enough to see by? In answering this question, the traditional measurement of luminance cannot be depended upon to correlate to the brightness of what the human sees.

Part of the rather general confusion on the subject of human visual response concerns "the visibility curve of the eye" (FIG. 1-A) versus the actual response of the human visual system (FIGS. 1-B, 2, 3, 4). The component spectral responses of FIGS. 2-$\alpha$ are visual-system responses, and not retinal absorptions or retinal sensitivities. Recent research among the cells in the cortex—far deeper in the visual system than retinal components— has shown sharper spectral sensitivities than are characteristic of the cells in the retina. Thus the peak responses of the normal human visual system are rather sharply defined, and at variance with the traditional views of eighty years ago when the "visibility curve" was presented as characteristic of human vision.

How does this affect "brightness"? The schools teach that illumination by 50 bluish footcandles or by 50 yellowish footcandles is equally bright. It is not. In fact, one footcandle of green light or of red light is twice as bright as one footcandle of yellow light. Yellow light is seen to be much dimmer than it is measured (by the footcandle meter). This is why illumination by modern sodium lamplight is continually reported to be much dimmer than the footcandle-meter would lead the human observer to believe. Or, if one looks for the band of yellow light which ought to be visible in a rainbow, the yellow is actually so dim as to be hardly visible.

The visual responses of FIGS. 1-B,2,3,4 suggest that white light should be composed of those three spectral colors to which the human visual system responds most strongly, if maximum visual response (perceived brightness per watt input) is desired.

Traditionally, the "luminosity curve" is regarded to peak at about 555 nm in the yellow-green region of the spectrum (see FIG. 1-A) under normal illumination levels. At much lower levels of illumination, it is considered to shift toward the blue and to peak near 500 nm in the blue-green.

Figure 5:
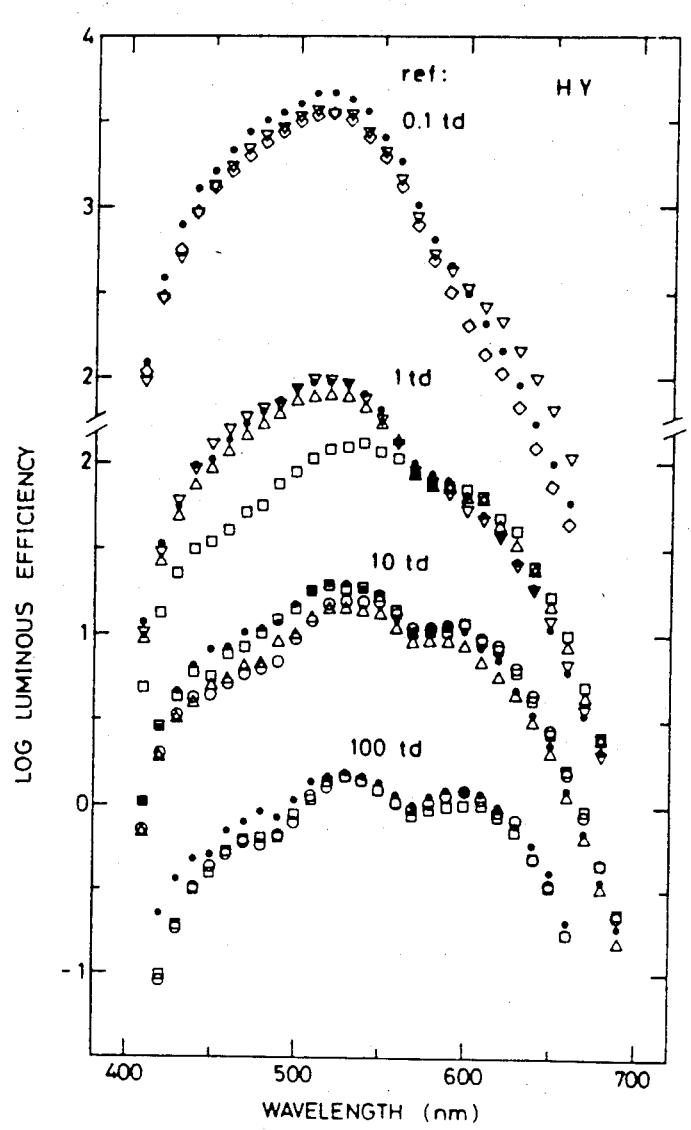
FIG. 5 shows (logarithmic) curves of human visual response as measured at a range of intensities, from very high brightness levels (100 troland curve at the bottom) to very low brightness levels (0.1 troland curve at the top)

For some years, Japanese scientists have been performing important visual experiments, in attempts to determine the true visual response curves at various levels of illumination. FIG. 5 shows one set of their results. The logarithmic scale shows, at the bottom, the three-peaked sensitivity curve characteristic of high illumination levels, where the three components are clearly apparent. Because the blue-violet component is relatively weaker (at high illumination), the green and orange-red components predominate and cause the overall curve to center around 550 nm in the yellow-green. Ascending the scale of FIG. 5, to lower and lower intensities of illumination, the orange-red component of response grows weaker, leaving the blue-violet and green responses to predominate, and give the appearance of a shift toward the blue and a centering around 500 nm, at the top of the Figure.

Thus FIG. 5 shows that human photopic sensitivity (normal brightness levels) is composed of three separate peaks near 450,530,610 nm and that scotopic sensitivity (low level illumination) is composed of the same three peaks, but at different magnitudes; at low brightness, red sensitivity decreases and blue sensitivity increases so as to make the composite curve seem to move to shorter wavelengths, peaking near 500 nm rather than near 550 nm.

Figure 6:
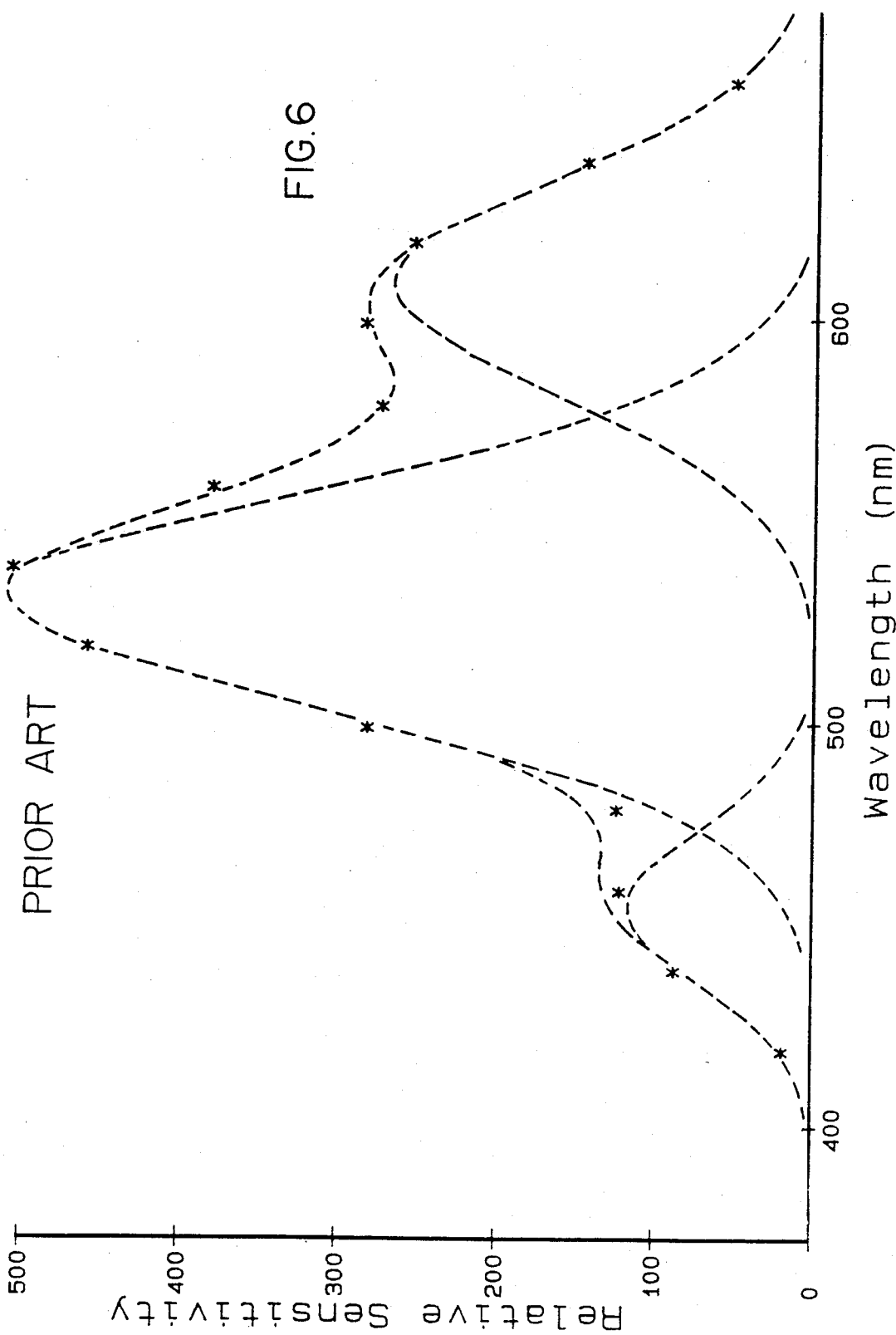
FIG. 6 is a linear plot of the lowest curve (high brightness) of FIG. 5; the three components of sensitivity are more clearly shown.
Figure 7:
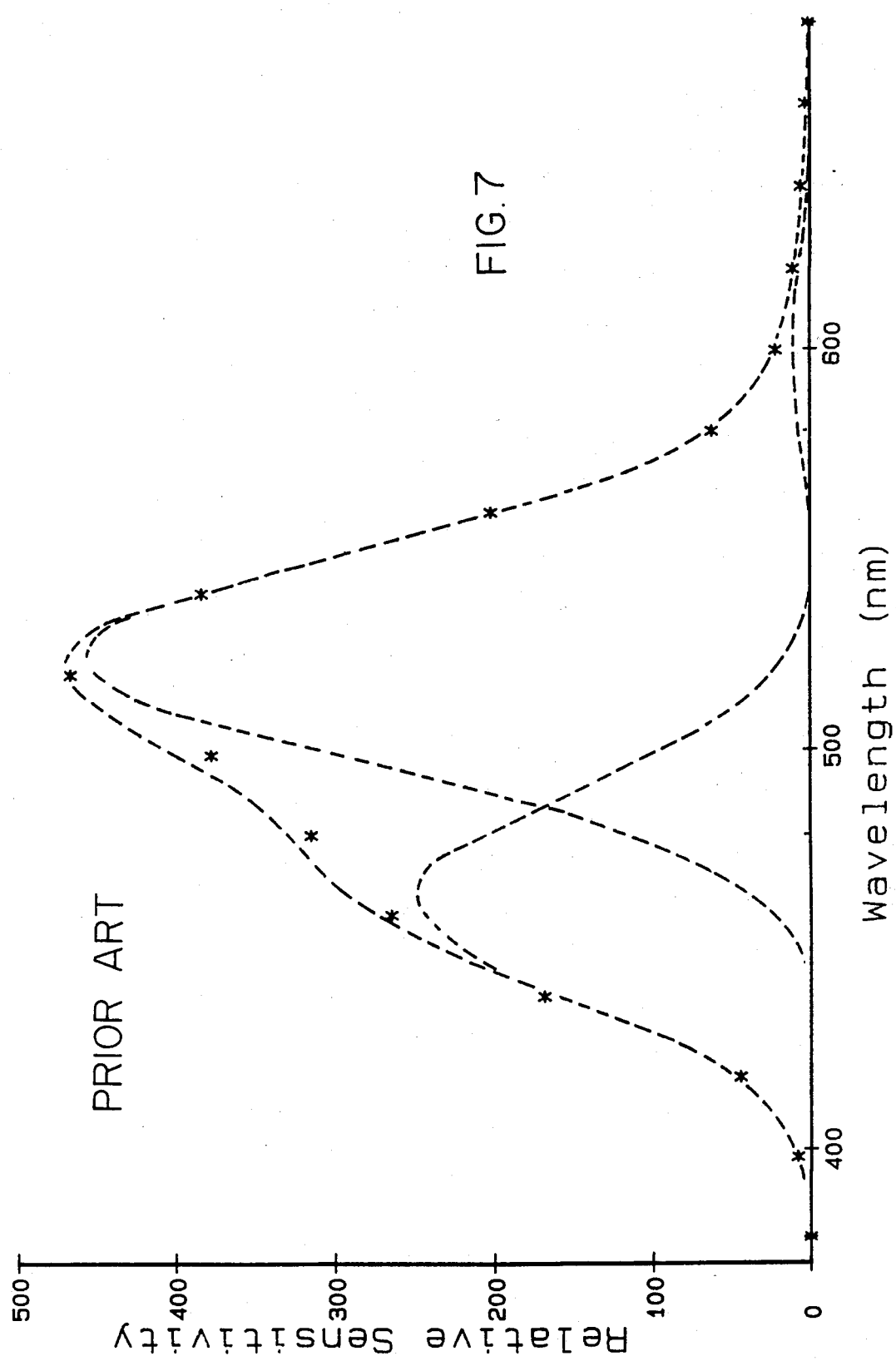
FIG. 7 is a linear plot of the highest curve (low brightness) of FIG. 5; the three components of sensitivity are still clearly shown, although the orange-red component is now much weaker.

FIGS. 6 and 7 are linear plots (as distinguished from the logarithmic plots of FIG. 5) of the 100 troland (td) (high brightness) curve, and of the 0.1 troland (td) (low brightness) curve, of FIG. 5; they show, too, that at both high and low brightness the same three visual responses are present.

A most important conclusion, drawn from the data of FIGS. 5,6,7 and from those of other workers, is that human visual response comprises three independent peaks centered near 450, 530, 610 nm, whatever the intensity of the illumination may be.

It may be added that apparently the old idea that visual sensitivity at low illumination is largely due to retinal "rods", while that at higher illumination is largely due to retinal "cones", must be mistaken, and that sensitivity at all levels of illumination is due to the same three system responses, peaking near 450 nm, 530 nm, and 610 nm.

Figure 8:
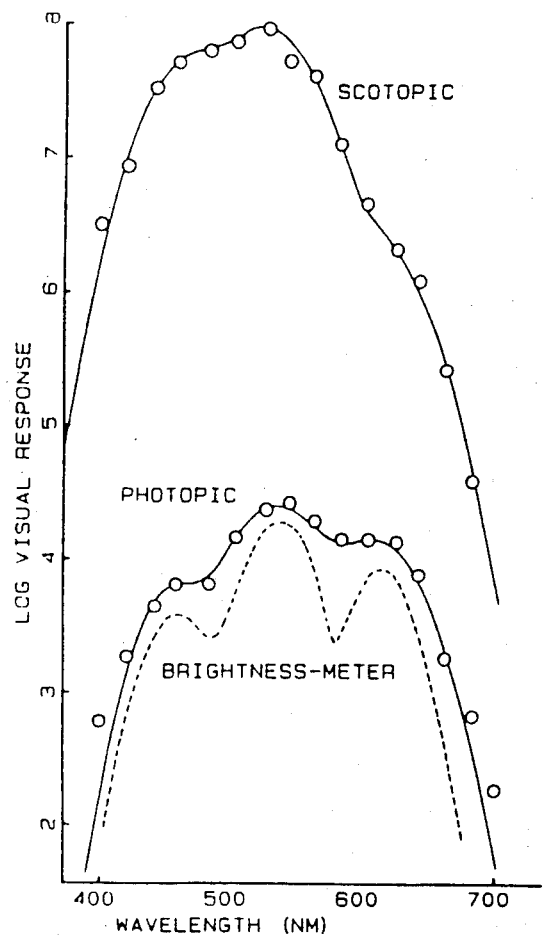
FIG. 8 repeats the upper and lower curves of FIG. 5, and also shows the response of a "brightness meter" (U.S. Pat. No. 4,334,782 issued June 15, 1982) designed to emulate human visual response.

In Fig. 8 are shown published visual data and the response of the "Brightness Meter" of U.S. Pat. No. 4,334,782 tailored to emulate human visual response. It is on these system-responses that good-seeing by civilian, military, or other observers through filters, goggles or visors must depend.

In accord with these results, some much-older data, at very low light levels, show that frequency-of-seeing of dim colored lights, at visual threshold, shows sharp peaks at 450,540,610 nm.

It has been shown that blue-violet-content, green-content, and orange-red-content are the constituents of incoming lights to which the human visual system responds most strongly. These same three contents are also shown (expectably) to be the brightest. It is also shown that this is true at low levels of illumination as well as at high levels.

Yellow-content of light is power in the "yellow wavelength" range of about 565–595 nm, as distinguished from "yellow-appearing light", which may be composed of green light plus red light with no power whatever at "yellow wavelengths". Yellow-content plays a unique role in human vision—it is always troublesome. Thirty years of work with spectral power distributions of commercial lamplights have shown that yellow-content in white light (a) reduces the sharpness of seeing, contributes a sensation of fogginess and lack of clarity to the scene, and (b) contributes to a sensation of dimness of the observed scene.

The causes of this influence of yellow-content are not clear. However, it has been stated that an important class of red-green opponent cells in the visual cortex (a) is responsible for seeing sharp detail in a scene, and (b) is inhibited by yellow-content in incoming light. Thus, the presence of power at 'yellow' wavelengths (565–595 nm) in illumination, or in reflected light from objects, interferes with the seeing of sharp detail.

Since human vision needs green-content and red-content to see fine detail, yet sees mixtures of green plus red light as yellow, yellow goggles which block 'yellow' wavelengths but pass green and red would be still more beneficial to good-seeing than the more conventional yellow goggles in common use.

Again considering low levels of illumination, it has been pointed out that the red-green visual response (essential for sharpness of vision) is activated at a lower light level than is the yellow-blue response. Thus it is expected that sharpness of seeing will persist optimally into low levels of illumination if red-content and green-content are provided but yellow-content is excluded.

It has been shown that the three spectral responses making up the overall "visibility curves" of FIGS. 1-B and 2-8 are peaked at about 450 nm in the blue-violet, 530 nm in the green, and 610 nm in the orange-red regions of the visible spectrum. It is important to note that the peak responses fall at substantially the same three wavelengths whether illumination level is high or low. The implication is that visual response per watt of incoming light is a maximum near the wavelengths 450 nm, 530 nm, and 610 nm whatever the level of illumination. It follows that, for greatest visual efficiency, lights entering the eye, whatever their color, should be composed of spectral bands centered near 450 nm, 530 nm, and 610 nm. A filter having three narrow pass-bands at these wavelengths ensures greatest visual efficiency per watt input.

Figure 9:
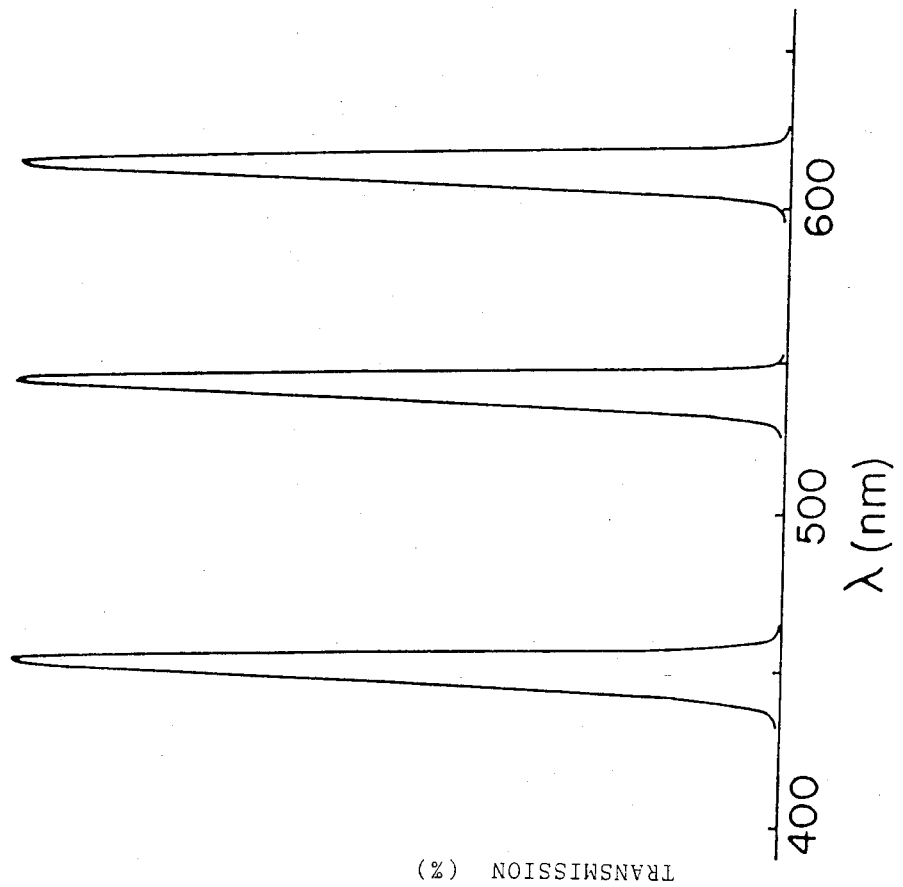
FIG. 9 is the transmission curve of a filter typical of the present invention.

Thus, a filter designed for good-seeing at any level of illumination should have three transmission bands centered in the above wavelength regions, and should exclude radiation at other wavelengths. Such a filter transmission, in accord with the present invention, is shown in FIG. 9.

Depending on the application for the filter, the width of the transmission bands should be from about 3–5 nm to about 50 nm as measured at one-half the maximum radiation transmission of each of the bands.

The optical transmission of this filter material is characterized by the presence of three transmission bands. One transmission band is centered near 450 nm in the blue-violet region of the visible spectrum. The second transmission band is centered near 530 nm in the green region of the visible spectrum. The third and last transmission band is centered near 610 nm in the orange-red region of the visible spectrum. The area of the substrate, the widths of the transmission bands, and the maximum percent transmission at the peaks of the bands, are chosen in accord with the application of the filter. The shape of the substrate is also chosen according to the application.

SPECIFIC APPLICATIONS FOR THE PRESENT FILTERS

In the foregoing theoretical discussion, the roles of the various color-contents of lights entering the eye were identified. Three bands or contents — namely, blue-violet, pure green, and orange-red — were identified as being particularly useful to good-seeing, at any light-level. Such findings offer an approach to improved filters for divers, for factory and office windows, for contact lenses, for laser protection, for driving in bright sunlight, and possibly even for driving after dark, to cite some examples.

The general requirement is a filter, through which the observer looks, which transmits the three bands of visible light that contribute most effectively to good-seeing. The widths of the transmission bands should vary with the application. At low illumination levels, or if a very bright scene is desired, the widths of the transmission bands may be as great as 50 nm full width at half-maximum. If the filter is to be used in eyewear to protect the wearer from laser beams, or from other extremely bright sources of light such as explosions, then the transmission bands may be as narrow as 3–5 nm full width at half-maximum.

As to the form of the filter, a transparent substrate may have deposited on it a plurality of absorbing layers (for example, paints or dyes) that in aggregate transmit only the desired bands. Or the absorbing means may reside in a single layer on the transparent substrate. Alternatively, the absorbing media may be incorporated directly in the filter material, in which case there would be no transparent substrate.

Rather than using absorbing means, a plurality of layers of varying index of refraction may be deposited on the substrate. Each of such layers is by itself transparent, but in aggregate forms a reflecting layer (commonly termed an interference layer) which transmits only the three desired bands of visible light.

Figure 10:
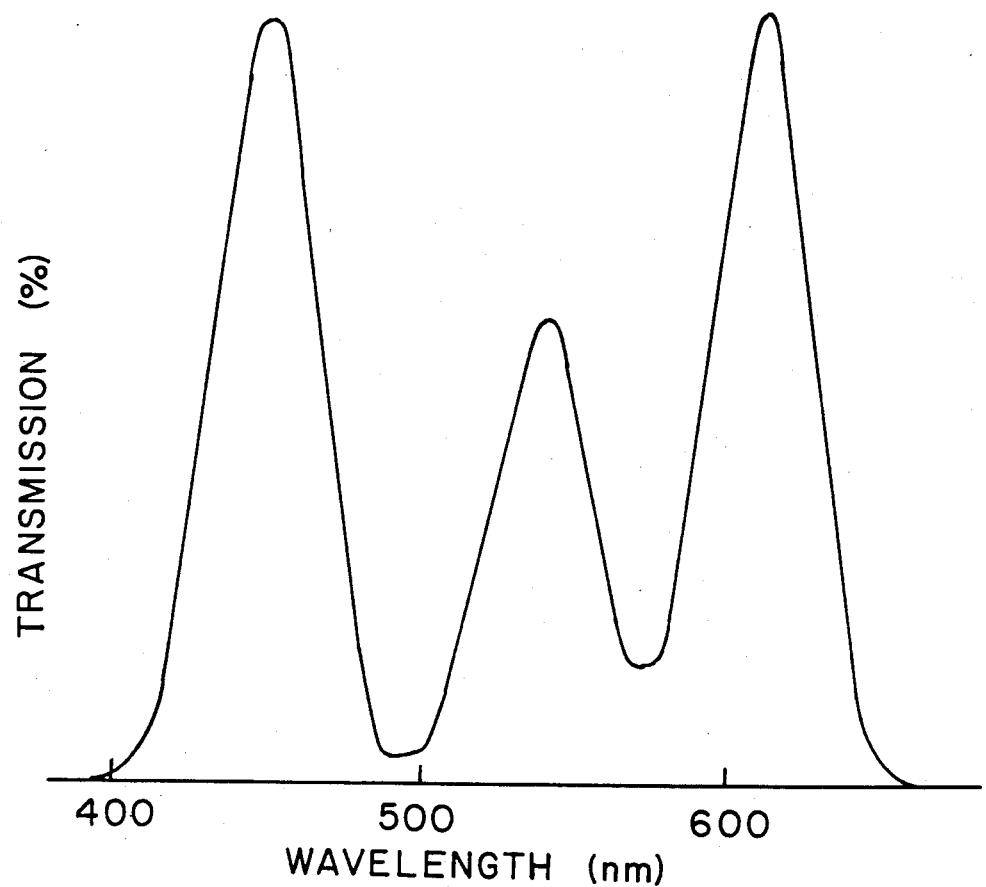
FIG. 10 is the transmission curve of a filter designed for divers.

For divers: Underwater illumination is likely to be dim. Therefore, transmission bands should be rather wide — for example, 30–50 nm at half-height. The scene, normally greenish, can be whitened by reducing peak-transmission of the center (green) band, see FIG. 10. This reduction of green transmission is easily achieved by adding a pale purple (absorption-type) filter, such as Corning #5073 or #5070 or Rosco #37 or #38. Coloration of the scene, as seen through all filters constructed according to the present invention, will be brighter than normal, thus making color-differences easier to see. The required filters are deposited on glass, set into goggles, or (on thicker glass) mounted as the faceplate of the diving suit.

For factory and office windows: In Florida, where natural sunlight is intense, band transmissions should be narrow, say 10–20 nm in width; in more northern latitudes, the band transmissions should be wider, say 30–50 nm. Incoming daylight can be tinted any hue desired by adjusting peak transmissions of the three bands. Thus, window filters can (1) tint the incoming light slightly green, (2) brighten coloration indoors (by reason of excluding the yellow-content of the daylight), and (3) improve general good-seeing in the interior illuminated space. Substrate is ordinary window-glass.

For contact lenses (to be used for skiing in bright sunlight, for example): Band transmissions should be narrow, say 10 nm, as in FIG. 9. Substrate is formed plastic, ground to prescription optical strength if desired.

For laser protection: Maximal exclusion, of all possible wavelengths of laser-light from the visual system, of course implies the admission to the visual system of only those wavelengths that are absolutely essential to seeing (450 nm, 530 nm, 610 nm). Therefore, band transmissions should be as narrow as possible, as narrow as the intensity of the surrounding illumination allows, for example, about 3 nm to about 15 nm. Substrate is glass or plastic, and protection from wide-angle entry should be provided.

For driving in bright sunlight: The "sunglasses" should have narrow transmission bands, as in FIG. 9. The filters may be deposited on normal plastic or glass blanks.

For driving at night: "Night glasses" should have wide transmission bands, say 50 nm or even somewhat wider. Using the three-band transmission, and specifically excluding "yellow wavelengths", the glare of oncoming headlights could be minimized.

Figure 11:
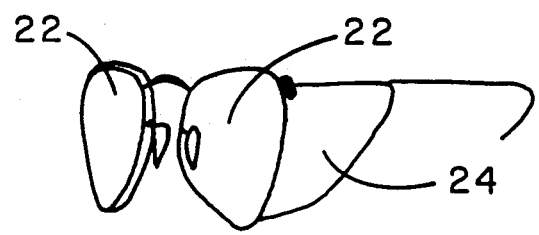
FIG. 11 is an isometric view of a pair of goggles wherein the lens portions are fabricated of the filters constructed in accordance with the present invention.

In FIG. 11 is shown a pair of goggles 20 which are fitted with lens filters 22 constructed in accordance with the present invention. For many applications, sideshields 24 are desirable.

Figure 12:
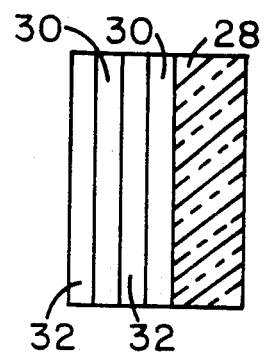
FIG. 12 is a schematic cross-sectional view of a filter system of the present invention wherein a transparent substrate carries thereon a plurality of thin layers of alternate high and low refractive index.

In FIG. 12 is shown a schematic cross-sectional view of a filter 26 in accordance with the present invention. The filter comprises a transparent substrate 28, formed of glass in the embodiment as shown, which carries thereon the plurality of alternate thin layers 30 and 32 formed of high-refractive index and low-refractive index material (i.e., an "interference" layer). The substrate could also be plastic if desired.

Following is a specific example for forming a filter for laser protection. Many-layer all-dielectric interference 'stacks' of evaporated layers of transparent materials of differing index of refraction are well-known in the literature. A typical many-layer all-dielectric interference filter is made up of alternating layers of, for example, zinc sulfide (ZnS), with an index of refraction of 2.35; and cryolite (Na3A1F6), with an index of refraction of 1.35; the layers are often one quarter-wave thick, for example 125 nm for a center wavelength of 500 nm. In the representation below, H represents a quarter-wave layer with high index of refraction, and L represents a quarter-wave layer with low index of refraction:

Air: HLHLHLHL HH LHLHLHLH: Glass

Such an all-dielectric Fabry-Perot filter, made up of alternating layers of zinc sulfide and cryolite, with a center wavelength of 530 nm, layer thickness 530/4 or 132 nm, would show a narrow transmission band at 530 nm flanked by regions of low transmission, then unsuppressed transmission sidebands rising near 450 nm and 610 nm. To that filter must be added a multiple half-wave filter, center wavelength at 530 nm, ratio of high-to-low indices of refraction about 1.6; the layers in succession are:

HHL HLHHL HLHHL HLHHL HLHH

The transmission of the added, second filter is high from 450 nm to 610 nm and low outside those wavelengths, so the combination transmits three narrow bands centered approximately on the wavelengths 450 nm, 530 nm and 610 nm.

An alternative to this procedure is, rather than adding the second filter — the multiple half-wave filter, to add two 'edge' filters in series with the Fabry-Perot filter. One edge filter should be a shortwave-pass filter, transmitting out to about 610 nm and suppressing transmission at longer wavelengths:

Air: HLLH (repeated about 15 times): Glass and the other edge filter should be a longwave-pass filter, suppressing all wavelengths up to about 450 nm, and then transmitting all longer wavelengths:

Air: LHHL (repeated about 15 times) 1.25 L: Glass where, for these filters, each layer is not quarterwave but eighth-wave. Stacking the resulting three filters one on another will again yield the desired three transmission bands.

A second alternative method of producing the desired transmission filter with three bands is shown below. This arrangement of layers is known as a phase dispersion filter:

Air:
HLHLHLHLHLHLHLHLHLLLLHLHLHL-
LHLHLHLHLH: Glass

The thickness of the layers decreases from quarter-wave at the outsides, near the air and glass, to tenth-wave near the center, where the LLLLL 'spacer' layer, of half-wave thickness, is found. The 'monitoring wavelength' is about 675 nm, so layer thickness varies from about 170 nm down to about 68 nm. Materials are zinc sulfide and cryolite.

Any one of the three alternatives described can of course be fabricated by evaporating the 'stacks' sequentially; only one substrate is needed.

In general, placing of the transmission peaks and cutoff points is governed by the thickness of the layers, and the breadth of the transmission peaks and sharpness of cutoff are governed by the number of layers used; broader peaks and broader cutoffs require fewer layers.

For laser protection, if the lasers are of such nature that they generate radiations within one or two of the specified transmission bands, an additional filter means can be used as a clip-on device as a supplement to the primary filter layer. Such additional filter means can be designed to block out or screen the radiations within the one or two of the transmission bands which are detected in the laser-threat wavelengths. For example, a thin layer of lycopene dye can be used to block out laser radiations in the neighborhood of 450 nm.

While interference-type filters should provide good performance for the present system, other types of filters can be substituted therefore provided the overall filtering objectives are substantially achieved. This could include providing some tinting of the substrate for one of the filters to be used.

I claim:
1. A filter system which operates to provide reasonable seeability for the human visual system while simultaneously limiting the total radiation energy which impinges upon the eye, said filter system comprising:
   a transparent substrate,
   a plurality of thin radiation-transmissive layers carried on said substrate, said layers having varying indices of refraction which alternate from layer to layer between a high index and a low index, the varying indices of said layers and the varying thicknesses of said layers being predetermined to substantially confine the radiations passing through said filter system to three bands in the visual range of wavelengths, said bands having a maximum of transmission respectively centered at about 450 nm, 530 nm and 610 nm, and the width of said transmission bands being from about 3 nm to about 50 nm as measured at one-half the maximum radiation transmission of each of said bands.

2. The filter system as specified in claim 1, wherein said filter system comprises at least one eye-covering shield conformed for human use.

3. The filter system as specified in claim 2, wherein said filter system is adapted for undersea use and the maximum transmission in the 530 nm band is limited to color correct combined radiations passing through said filter system.

4. The filter system as specified in claim 2, wherein said filter system is adapted for laser protection and the width of said transmission bands is from about 3 nm to about 15 nm as measured at one-half the maximum radiation transmission of each of said bands.

5. The filter system as specified in claim 4, wherein an additional filter means is adapted to be fitted over said filter system, said additional filter means is operative to absorb a predetermined one or two of said transmission bands, and said additional filter means can be used to supplement said filter layer when the presence of radiations within said predetermined one or two of said transmission bands is detected in the laser-threat wavelengths which can be countered.

6. A filter system which operates to provide reasonable seeability for the human visual system while simultaneously limiting the total radiation energy which impinges on the eye, said filter system comprising: a radiation-transmitting substrate and selective radiation-transmitting filter means operatively associated with said substrate, said substrate and said filter means substantially confining the radiations passing through said filter system to three bands in the visible range of wavelengths, said bands having a maximum of transmission respectively centered at about 450 nm, 530 nm, and 610 nm, and the width of said transmission bands being from about 3 nm to about 50 nm as measured at one-half the maximum radiation transmission of each of said bands.

7. The filter system as specified in claim 6, wherein said filter system comprises at least one eye-covering shield conformed for human use.

8. The filter system as specified in claim 7, wherein said filter system is adapted for undersea use and the maximum transmission in the 530 nm band is limited to color correct combined radiations passing through said filter system.

9. The filter system as specified in claim 7, wherein said filter system is adapted for laser protection and the width of said transmission bands is from about 3 nm to about 15 nm as measured at one-half the maximum radiation transmission of each of said bands.

10. The filter system as specified in claim 9, wherein an additional filter means is adapted to be fitted over said filter system, said additional filter means is operative to absorb a predetermined one or two of said transmission bands, and said additional filter means can be used to supplement said filter layer when the presence of radiations within said predetermined one or two of said transmission bands is detected in the laser-threat wavelengths which can be countered.

* * * * *